US010963852B1

(12) United States Patent
Edwards et al.

(10) Patent No.: US 10,963,852 B1
(45) Date of Patent: Mar. 30, 2021

(54) SECURE FILE TRANSFER SYSTEM USING AN ATM (71) Applicant: Capital One Services, LLC, McLean, VA (US)

(72) Inventors: Joshua Edwards, Philadelphia, PA (US); Abdelkader Benkreira, Washington, DC (US); Michael Mossoba, Arlington, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/578,610

(22) Filed: Sep. 23, 2019

(51) Int. Cl.
| *G06K 5/00* | (2006.01) |
| *G06Q 20/10* | (2012.01) |
| *G06F 21/60* | (2013.01) |
| *G06F 16/16* | (2019.01) |
| *H04L 29/08* | (2006.01) |
| *G08B 5/22* | (2006.01) |
| *H04W 4/80* | (2018.01) |
| *H04W 84/12* | (2009.01) |
| *H04L 29/06* | (2006.01) |

(52) U.S. Cl.
CPC ....... *G06Q 20/1085* (2013.01); *G06F 16/162* (2019.01); *G06F 21/602* (2013.01); *H04L 67/06* (2013.01); *G08B 5/22* (2013.01); *H04L 67/42* (2013.01); *H04W 4/80* (2018.02); *H04W 84/12* (2013.01)

(58) Field of Classification Search
CPC .... G06K 19/00; G06Q 20/20; G06Q 20/4014; G06Q 20/1085

USPC ......................................... 235/380, 383, 379
See application file for complete search history.

(56) References Cited

U.S. PATENT DOCUMENTS

| 7,021,534 | B1 | 4/2006 | Kiliccote |
| 7,314,167 | B1 | 1/2008 | Kiliccote |
| 7,379,921 | B1 | 5/2008 | Kiliccote |
| 7,380,708 | B1 | 6/2008 | Kiliccote |
| 7,770,787 | B2 | 8/2010 | Anderson |
| 8,132,244 | B2 | 3/2012 | Baltzer |
| 8,332,320 | B2 | 12/2012 | Singh |
| 2003/0037240 | A1 | 2/2003 | Yamagishi et al. |
| 2003/0191949 | A1 | 10/2003 | Odagawa |
| 2004/0117618 | A1 | 6/2004 | Kawaguchi et al. |
| 2006/0175397 | A1 | 8/2006 | Tewari |
| 2007/0107050 | A1 | 5/2007 | Selvarajan |
| 2008/0183515 | A1* | 7/2008 | Chheda ................. G06Q 40/00 705/38 |
| 2009/0024506 | A1 | 1/2009 | Houri |
| 2009/0055319 | A1 | 2/2009 | Raheman |

(Continued)

*Primary Examiner* — Daniel St Cyr
(74) *Attorney, Agent, or Firm* — Hunton Andrews Kurth LLP (57) ABSTRACT

An ATM can receive a media file from a client device and transmit the media file from the ATM to a server. Each of the ATM and the client device can include a master key and the client device can encrypt the media file using the master key before sending the media file to the ATM. The ATM can decrypt the media file using the master key and analyze the media file by a processor of the ATM before transmitting the media file to the server. Analyzing the media file can include one of applying an OCR algorithm to the media file, performing a template algorithm, using a natural language processing technique, using a computer vision method and looking for a watermark.

19 Claims, 5 Drawing Sheets

(56) References Cited

U.S. PATENT DOCUMENTS

| | | | |
|---|---|---|---|
| 2011/0055896 A1 | 3/2011 | Suginaka et al. | |
| 2011/0140834 A1 | 6/2011 | Kiliccote | |
| 2012/0159598 A1 | 6/2012 | Kim et al. | |
| 2012/0292388 A1 | 11/2012 | Hernandez | |
| 2013/0117815 A1 | 5/2013 | Goranov | |
| 2013/0124410 A1* | 5/2013 | Kay | G06Q 40/02 705/43 |
| 2013/0141213 A1 | 6/2013 | Akutsu | |
| 2014/0081858 A1* | 3/2014 | Block | G07F 19/207 705/43 |
| 2014/0198330 A1* | 7/2014 | Gajera | H04N 1/00519 358/1.13 |
| 2014/0236791 A1* | 8/2014 | Palmer | G06Q 40/02 705/35 |
| 2015/0046340 A1 | 2/2015 | Dimmick | |
| 2015/0058931 A1* | 2/2015 | Miu | H04L 63/126 726/3 |
| 2015/0081714 A1* | 3/2015 | Byron | G06F 3/04842 707/739 |
| 2016/0027015 A1 | 1/2016 | Redpath | |
| 2016/0062972 A1* | 3/2016 | Ramakrishnan | G06Q 40/02 715/226 |
| 2016/0189147 A1 | 6/2016 | Vanczak | |
| 2016/0253651 A1* | 9/2016 | Park | G07F 9/023 705/39 |
| 2016/0295404 A1 | 10/2016 | Gouget et al. | |
| 2017/0232204 A1* | 8/2017 | Knapp | G06F 19/3468 604/66 |
| 2017/0346816 A1 | 11/2017 | Malmborg et al. | |
| 2018/0101602 A1* | 4/2018 | Allen | G06F 16/90332 |
| 2018/0232204 A1* | 8/2018 | Ghatage | G06F 7/02 |
| 2018/0253707 A1* | 9/2018 | Cappelli | G07F 19/211 |
| 2019/0052467 A1* | 2/2019 | Bettger | H04L 9/3239 |

* cited by examiner

SECURE FILE TRANSFER SYSTEM USING AN ATM

BACKGROUND

An automated teller machine ("ATM") is an electronic telecommunications device which enables certain transactions at any time and without the need for direct interaction with bank staff. ATMs are ubiquitous these days. ATMs can be found at drive-through locations or even indoor locations.

SUMMARY

Wi-Fi networks can be accessible publicly, and as a result, these networks can be susceptible to spoofing and man-in-the-middle attack. An attacker can intervene in a communication and record the data being communicated. Although encryption in certain instances can prevent such attacks, encryption is not always effective. For example, even if the attacker is unable to understand the data at the moment of recording (because the data is encrypted), the attacker might be able to evaluate the data at a later point in time when the encryption key is compromised. The attacker will use the key to decrypt the past recorded communication and exploit the data. As the computing power of computer systems increase, a recorded data can also be susceptible to a brute force attack. In short, even though an attacker might not be able to understand a communication between two parties now, the attacker could access such conversations in future, thereby compromising confidential and proprietary information of the parties. Therefore, it is an object of this disclosure to provide for a file transferring system which can minimize the risk of such third party attacks.

Additionally, internet fraud has become a widespread and costly problem for many enterprises. There are many instances in which an enterprise desires to authenticate an individual before conducting a transaction with the individual. However, there are very few effective methods which can verify the identity of the individual over the internet. This problem stems from the fact that it is very difficult to de-anonymize a person over the internet. Therefore, it is another object of this disclosure to verify the identity of an individual before a document or file is accepted from the individual.

The present disclosure addresses these problems by providing an ATM system which can receive media files from users, and in certain circumstances, transmit media files to the users. When an individual physically visits an ATM to transfer a file or document to the ATM, the individual can be asked to connect to a network provided by the ATM provider. This can reduce the risk of third party attacks because the ATM is located in a controlled environment. Additionally, because the individual has to be present to conduct the transaction or because the individual can be required to present an identification card before conducting the transaction, there can be a higher confidence about the individual's identity.

In one example embodiment, an ATM can receive a media file from a client device and transmit the media file from the ATM to a server. Each of the ATM and the client device can include a master key and the client device can encrypt the media file using the master key before sending the media file to the ATM. The ATM can decrypt the media file using the master key and analyze the media file by a processor of the ATM before transmitting the media file to the server. In one embodiment, analyzing the media file can include one of OCRing the media file, performing a template algorithm, using a natural language processing technique, using a computer vision method and looking for a watermark.

In one example embodiment, the ATM can display a warning on a display of the ATM if the processor determines that the client device did not provide a requested document, e.g., provided a defective document. The warning can indicate that the quality of the media file is low, a wrong document is provided to the ATM or the date of the document is invalid.

In one example embodiment, the wireless technology is one of Bluetooth, Wi-Fi, and NFC and the media file is a photo of a physical document. The client device can capture the photo using a camera of the client device.

In one example embodiment, prior to receiving the media file at the ATM, the client device is synced or paired with the ATM. The ATM is configured to display a verification message on a display of the ATM such that the verification message indicates to a user of the client device if the client device is synced or paired with a correct ATM. In addition, the verification message displays an identity of the client device connected to the ATM.

In one example embodiment, prior to activating a wireless receiver of the ATM for receiving a media file, the ATM is configured to receive a signal from a contactless card. The ATM is configured to activate the wireless receiver for receiving the media file in response to receiving the signal.

In one example embodiment, the ATM is configured to store the media file in a short-term access memory of the ATM prior to transmitting the media file to the server. The ATM is further configured to delete the media file from the short-term access memory after transmitting the media file to the server.

DETAILED DESCRIPTION

In an example embodiment, an ATM can include a housing. Various components of the ATM can be located it the housing. The housing can include an access door for feeding various supplies and money into the ATM. The housing can also include an interface area. The housing can protect various components of the ATM against damage and vandalism. The housing can also enhance the aesthetics of the ATMs.

Figure 1:
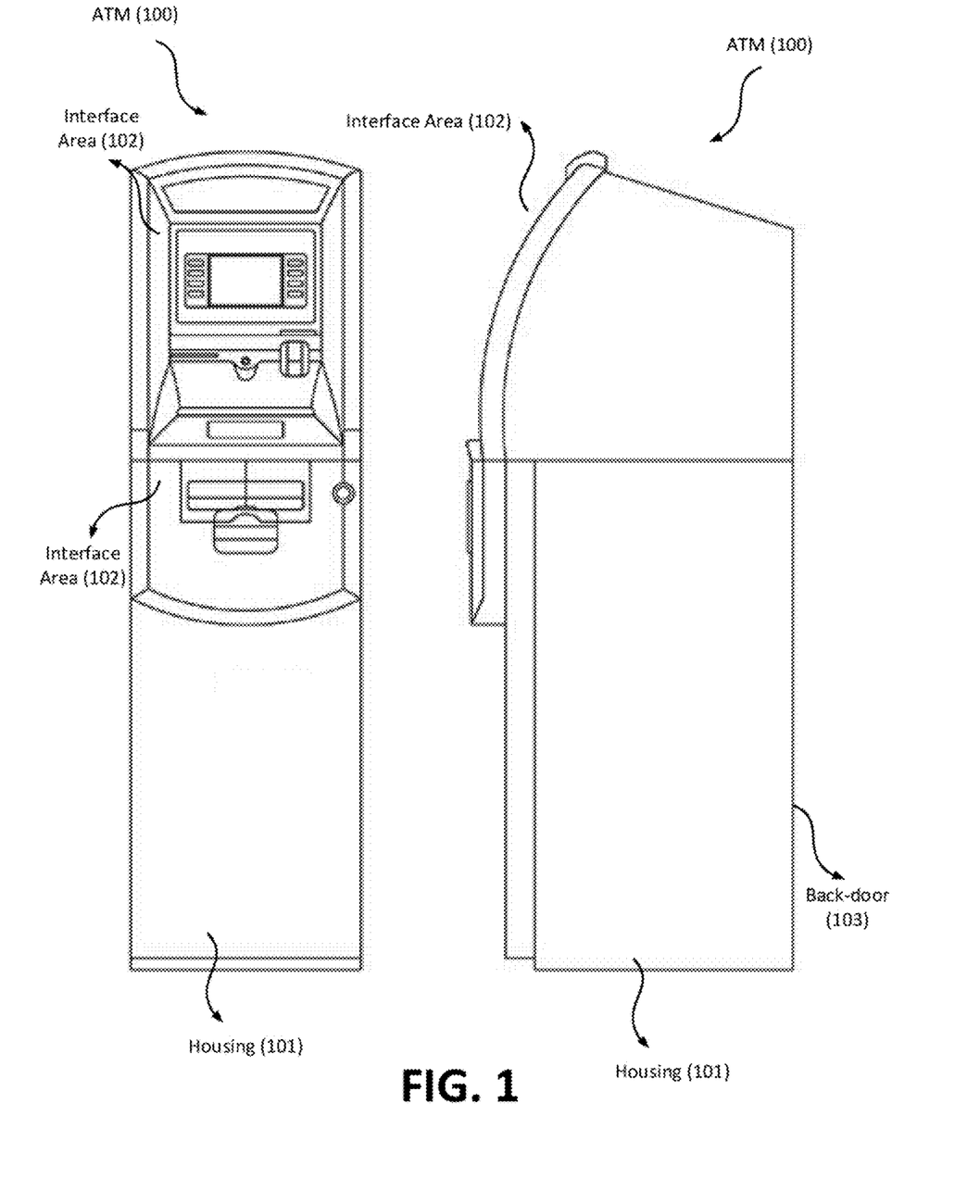
FIG. 1 shows front and side views of an ATM according to an example embodiment.

FIG. 1 shows front and side views of an ATM 100 according to an example embodiment. In this example embodiment, the ATM 100 includes a housing 101 and an interface area 102. The ATM can also include a back-door 103, which facilitates access to the inner components of the ATM as well as a vault. An ATM can provide a user with banknotes. A banknote (bill, paper money, paper currency or note, hereafter referred to collectively as a "note" or "notes") can be a medium of exchange for goods or services.

The Components of the ATM

In an example embodiment, the ATM can include a vault. Certain parts or components of the ATM can require restricted access, and the vault can store these parts or components. For example, the vault can protect a processing unit. The vault can also be used as a storage for money. In some embodiments, the money can be placed in cassettes and the vault can include a space for storing the cassettes.

In an example embodiment, an ATM can include a processing unit. The processing unit can include a processor, a memory (and/or hard drive), a transmitter and a receiver. The processor can execute and run an operating system software stored on the memory (and/or hard drive) of the processing unit. Using the transceivers (i.e., transmitters and receivers), the processor can connect to a network, such as the Internet, and transmit and receive signals form a server. For example, the ATM can respond to polling requests received from the server, and in response to receiving messages from the server, the processor can cause a speaker or display of the ATM to emit sounds or display visual cues. The transceivers can use APIs for communications with the server. Additionally, the transceivers can communicate with a client device such as a cellphone, tablet or other wireless devices. The transceivers can use standard wireless communication protocols for these communications, e.g., Wi-Fi, Bluetooth, NFC, etc. In certain instances, the communications can be encrypted.

The processor can also send and receive various signals to other components of the ATM, e.g., a display, a speaker, a cash dispenser, a card reader or a sensor. Using these signals, the processor can control the operation of these components. The processor can also cause the operating system software to show a user interface on a display of the ATM or emit various sounds via the speaker. In some embodiments, the processor, using the transceivers, can communicate with a smart device, which can be a mobile device, a cellphone, a smartphone, a laptop, a desktop, a notebook, a tablet, a wearable device, etc.

In some embodiments, the ATM can include a secure cryptoprocessor. The secure cryptoprocessor is a dedicated computer on a chip or microprocessor for carrying out cryptographic operations, embedded in a packaging with multiple physical security measures, which give it a degree of tamper resistance. The secure cryptoprocessor can be located in a secure enclosure or the vault.

In an example embodiment, the ATM can include a card reader. There can be several types of card readers, e.g., contact and contactless. A card reader can read information from and write information onto a smart card. In some embodiments, the card reader can pass information from the smart card to processing unit and write information from the processing unit into the smart card. The card reader can provide power to the smart card and link the card's hardware interface to the processing unit. Since the smart card's processor can control the actual flow of information into and out of the card's memories, the card reader can operate with only minimal processing capabilities for sending the information to the processing unit. In one example embodiment, the card reader can establish a wireless NFC communication with a client device.

In some embodiments, the card reader can include a processor and a transceiver. The contact type smart cards generally include an interface, which can consist of an 8-contact connector (e.g., contact pad 102). The interface can look like a small gold circle or series of squares on the surface of the card. Other arrangements are also possible. The card reader can include several connector pins. In order for a card reader to communicate with the contact-type card, the pins of the card reader's connector must physically touch the contacts on the smart card's connector during data transfer. The processor of the card reader can decode any data received from the smart card. The card reader can also update, delete or modify the information stored on the smart card.

A card reader can write data on the smart card by passing the data to the processor of the smart card. The processor can process the data and store it in the smart card's memory. A card reader can have a two-way communication with a smart card as described in ISO 14443. The smart card can include an RFID tag. The two-way communication can be digitally encoded. There can be several frequency ranges, and several proprietary formats for the two-way communication (e.g., HID in the 125 Mhz range). The 13.56 Mhz frequency range (NFC) is dominated by ISO 14443 compatible cards.

A card reader and a smart card can exchange messages, which can include commands or data. For example, a card reader can send a command message to the smart card, the smart card can process the command message in its processor and the smart card can send back a response message to the card reader. Each of the command message and the response message can include data. A message can include TLV (Type, Length and Value) data and a command such as STORE_DATA command which prompts storage of the data included in the message in the smart card.

In an example embodiment, the ATM can include a keypad or other input devices. The keypad can include one or more keys for receiving commands from a user. For example, using the keypad, the user can select one or more options displayed on a display of the ATM. The ATM can include other input devices. For example, the ATM can include a touch pad screen, which can receive input or commands from the user. In some embodiment, the ATM can include one or more function key buttons. These function key buttons can be placed on the interface area of the ATM machine, e.g., next to the display.

In an example embodiment, the ATM can include a display. The display can be any display known in the art. For example, the display can be an LCD, CRT, OLED, AMOLED, e-Ink, electronic paper, etc. The display can show a user interface of the operating system. The user interface can show various options for operating the ATM. For example, the user interface can display various options for retrieving cash from the machine. In some embodiments, the display can be a touch screen display. For example, the user can navigate through the options of the user interface by touching the screen of the display.

In an example embodiment, the ATM can include a printer. The printer can print paper record for each transaction conducted at the ATM. For example, the printer can be a thermal printer, which can produce a printed image by selectively heating coated thermochromic paper when the paper passes over the thermal print head. Other printers are also known in the art and one of ordinary skill in the art recognizes that these printers can be used in the ATM.

In an example embodiment, the ATM can include various indicators. For example, the indicators can be LED lights which can inform the user about the status of the device, e.g., the device is out of order. In one embodiment, an indicator can indicate whether a user's device is connected or paired with the ATM. Once a user connects to a particular ATM, the indicator can reflect the connection.

In an example embodiment, the ATM can include at least one sensor. The sensor can be a camera or a motion detector.

Figure 2:
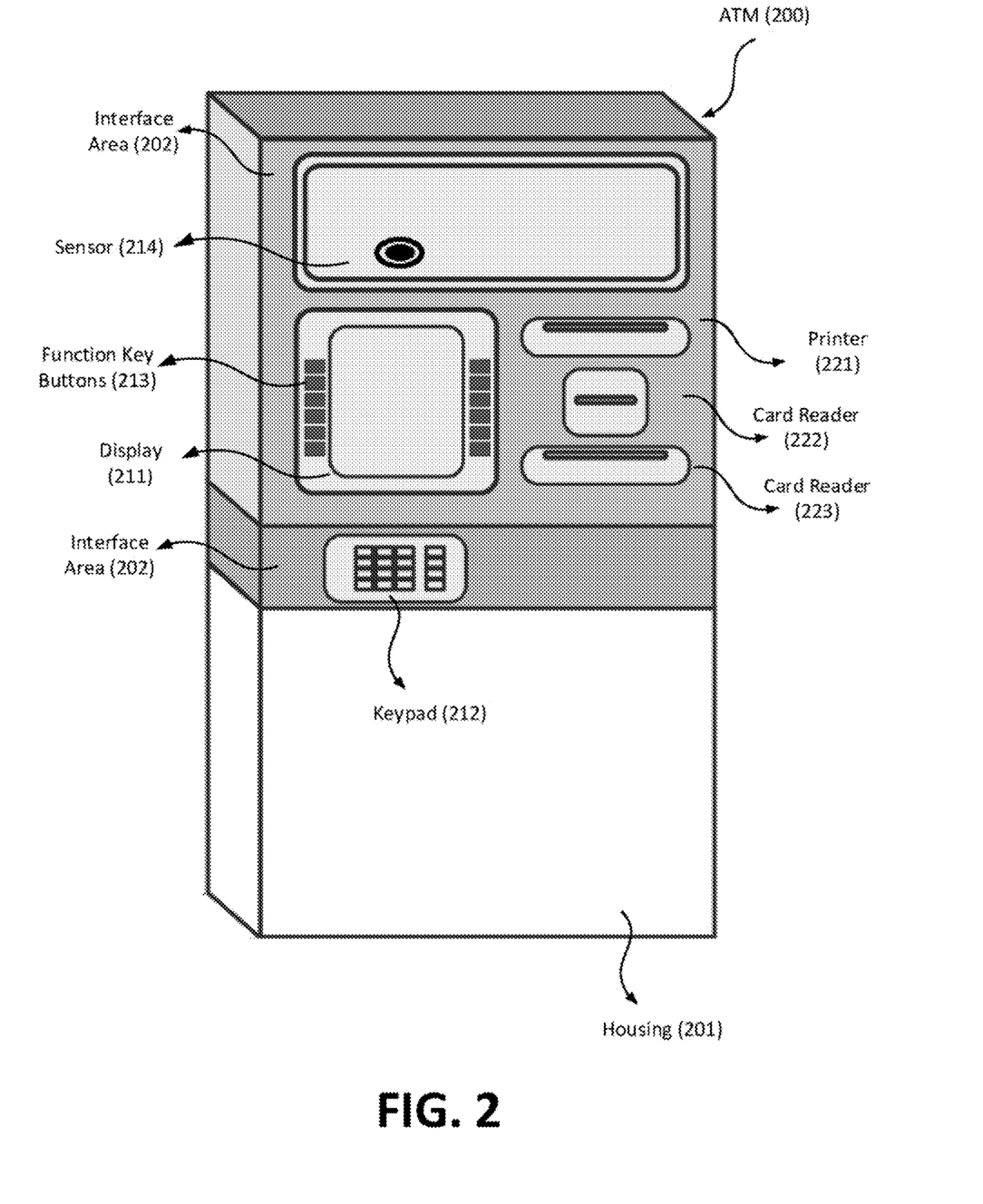
FIG. 2 shows an interface area of another ATM according to an example embodiment.

FIG. 2 shows the interface area 202 of an ATM 200 according to an example embodiment. The ATM 200 has a housing 201 and the interface area 202 is located on the top front of the housing 201. On the interface area 202, there is a display 211, a keypad 212, a set of function key buttons 213, a sensor 214. The interface area 202 also has a few orifices for providing prints from a printer 221, receiving and reading a smart card using a card reader 222 and dispensing cash using a cash dispenser 223. The printer 221, card reader 222 and cash dispenser 223 are placed behind the interface areas 202.

The Request

In one example embodiment, a user can receive a document or media file request ("request") from a service provider. The request can, e.g., indicate that the user needs to transmit an electronic copy of a document to an ATM. In one example, the request can ask the user to prepare a video and transmit the video to the ATM, e.g., to verify the identity of the user. In one example embodiment, the service provider can ask the user to provide updated biometric information, e.g., photo, fingerprint, voice sample, video, etc. The user can receive the request as an email or other form of communication, e.g., as a notification on an application of the user's device. The application can include a plurality of pages, and the request can be displayed on one of these pages. In one example, the request can indicate that the user should transmit an electronic copy of a media file (e.g., document) to a predetermined ATM.

In one example embodiment, the media file can be generated by, e.g., the user taking a photo of a physical document or making a video of the user. The media file can also be a file downloaded or stored on the user's device. For example, the user can draft a document and store it on the user's device. In one embodiment, the media file can be a document or form provided by the service provider for the user to fill out. The user can fill out the document or form and transmit it to the ATM.

Figure 3:
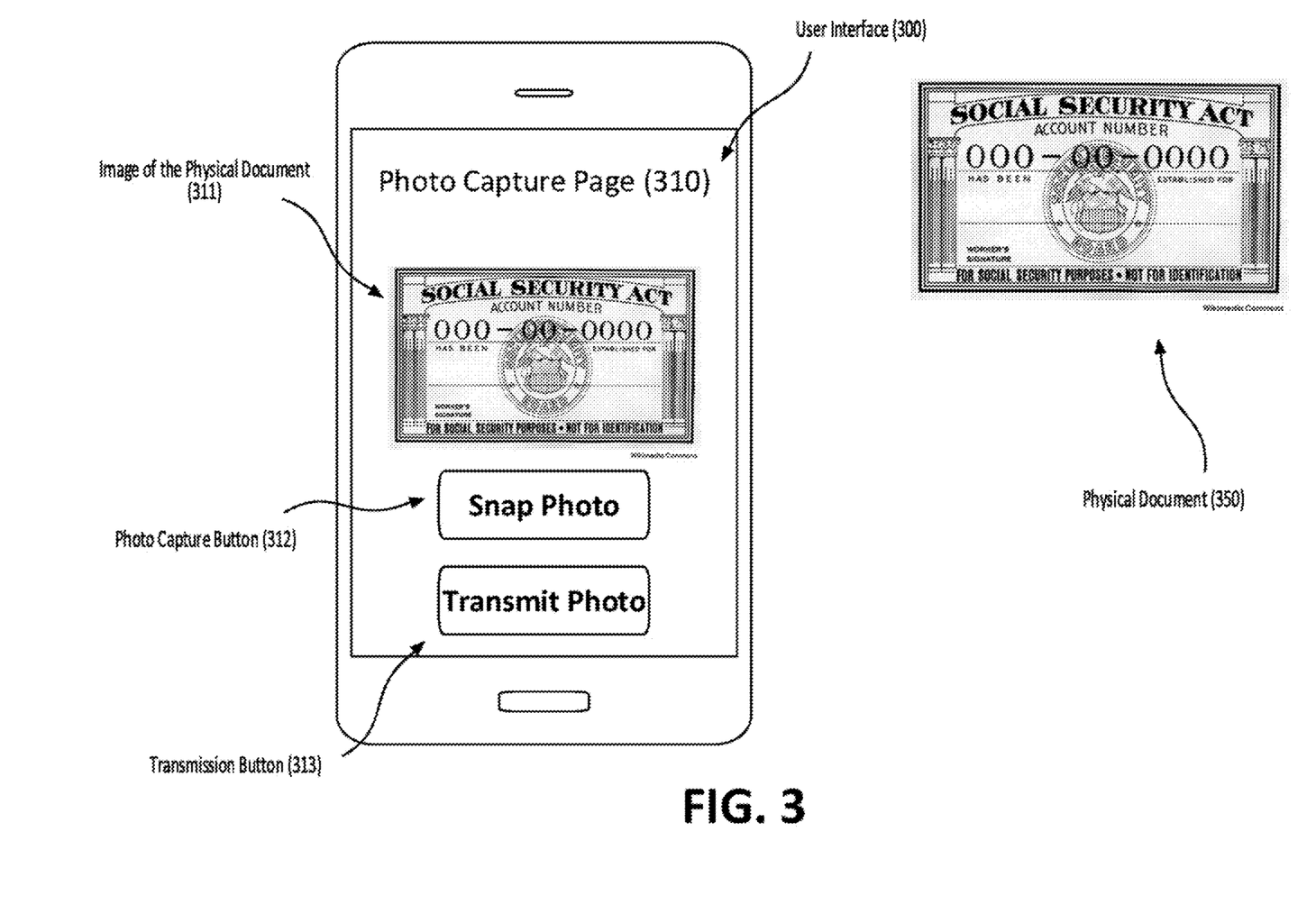
FIG. 3 shows an example user interface for an application of a device for taking a photo of a document and transmitting the photo to an ATM.

FIG. 3 shows an example user interface 300 for an application of a device for taking a photo of a document. In this example embodiment, a request has asked the user to upload a physical document 350 (i.e., the user's social security card) into an ATM. The user can use the device (or client device) for uploading the document into the ATM. The device can display a photo capture page 310 in the user interface 300. The photo capture page 310 can display an image of the physical document 311 on the page 310. The page 310 can also include a photo capture button 312 which if pressed by the user can cause the device to take a photo of the physical document 350 and show it as the image of the physical document 311. The page 310 can also include a transmission button 313 which when pressed by the user can cause the device to transmit the image of the physical document 311 to the ATM.

In an example embodiment, a user can submit a request to a service provider to receive an electronic copy of a document from an ATM. For example, the request can be submitted to a server of a bank to receive an electronic copy of the user's bank transactions. There can be various methods for submitting the request to the server. In one example, the request can be submitted through an application of a device of the user. The application can be a personal banking application.

In an example embodiment, the request can specify a location for transmission of the media file. For example, in the request, the service provider can specify the address for a local branch for the user to visit and transmit the media file. In another example embodiment, the request can specify a set of locations or a geographical area for transmission of the media file. For example, the request can specify that the user can visit any ATM in the Financial District of Manhattan, N.Y., to transmit the media file. In yet another example embodiment, the user can specify a location for retrieving an electronic copy of a document from an ATM.

In one embodiment, the user can specify a device that the user is going to carry with the user to the ATM. This device can verify the identity of the user. For example, the user can specify that the user is going to have a specific cellphone, button, credit card, debit card, or any other device with the user at the transmission location. The user can specify an identification number or name for the device to the service provider. The device can include a module for transmitting a signal to the server (or ATM) when the device is at a location related to the ATM, e.g., the bank premises. When the server receives a signal from the device, the server can designate one ATM for the user to approach. The device can include a module for causing a speaker of the device to emit sounds or the display of the device to display a notification in response to receiving a signal from the server. In one example embodiment, the ATM can require the user to scan the device at the ATM before the ATM allows the user to upload a file.

Designating the Appropriate ATM

In an example embodiment, the request indicates which ATM or ATMs the user can visit to transmit the document. The server can determine the ATM or ATMs based on a variety of factors or data. For example, the determination can be based on the current location of a user's device. A server of the service provider can transmit a signal to the device and ask for the device's location. The device can submit the GPS location of the device to the server and the server can determine the ATM based on the GPS location of the device, e.g., an ATM closest to the user. The server can also make the determination based on past location data for the device. For example, based on the data provided by the device over the past week or month, the server can determine a few locations. The server can select an ATM that is close to one of these locations.

As another example, the determination can be based on the ATM's or ATMs' features or capabilities, e.g., the server can select the closest ATM with NFC capabilities. As yet another example embodiment, the determination can be based on a strategy to maximize the utilization of all ATMs within an area. As yet another example, it can be based on a strategy to minimize the wait time for customers at the specified location. As yet another example, it can be based on a strategy to prioritize certain customers over other customers, e.g., based on a priority order assigned to each customer. The server determines a user's priority order based on the user's account status, e.g., users with elite account status receive service prior to other users.

In one embodiment, the server can assign requests to ATMs based on a strategy to maximize the utilization of all ATMs within an area. For example, if an ATM in an area is frequently used by clients, the server can assign the request to other ATMs in the same area to increase the utilization of these less frequently used ATMs. This strategy can maximize use of all ATMs in an area and minimize the wait time for these ATMs.

In one example embodiment, the server can assign requests based on a strategy to minimize the wait time for users at a specified location. For example, the server can estimate a wait time for each user waiting for service at ATMs of a particular area. The server can assign the requests to ATMs to minimize the wait time for some or all the users.

In one embodiment, the minimization of the wait time for users with elite status is prioritized over users without the elite status.

In one embodiment, prior to determining which ATM to assign to the request, the server can poll the ATMs available to be assigned to the request. For example, the server can poll the ATMs located near the customer to determine which ATMs are capable of receiving an electronic file from the customer. The server can assign requests to ATMs based on the ATMs' responses to the server's poll request.

In an example embodiment, the user's device can be a smart device or a cellphone and the device can include GPS capabilities. The device can also include an application which can monitor the GPS coordinates of the device. In one embodiment, the device can notify the server if the application determines that the device is at or near a location associated with an ATM. Upon receiving this information, the server can transmit a signal or notification to the device. The notification can include a message that asks the user to transmit an electronic document to the ATM.

In an example embodiment, the user's device can be a smart device or a cellphone and the device can include wireless capabilities such as radio, Bluetooth, Wi-Fi, cellular, etc. An ATM location can include one or more transmitters (or beacons), which can transmit wireless signals to the user's device. Using the signals, the user's device can determine that the device is located in or close to an ATM location (or the device can determine its location relative to the beacons), and the user's device can transmit this information to the server. Alternatively, the transmitters at the ATM location can receive a signal from the user's device, and using this signal, the transmitters (or a communication device connected to the transmitters) can notify the server that the user's device is within or close to the ATM location.

In an example embodiment, the determination of the ATM can be facilitated by a facial recognition technique. For example, the server can include a database, and for each accountholder, the database can include one or more photos of the face of the accountholder. The ATM location can include a camera. When a user enters an ATM location, the camera can take a photo of the user. A processing system at the ATM location can transmit the photo to the server. Using a facial recognition module or application, the server can determine the identity of the user who entered the ATM location. The processing system can also transmit a location identification number to the server, which can assist the server in determining the ATM. In one embodiment, the ATM assigned to the user is the ATM at which location the user is present.

Connection Between the Device and ATM

In one example embodiment, a user can visit an ATM, e.g., the ATM identified in the request. The user can establish a wired or wireless connection between a user device and the ATM. The user device can be a cellphone, smart phone, tablet, laptop, smart watch, wearable device, etc.

In one example embodiment, the user can insert an identification card in the card reader of the ATM. Using the identification card, the ATM can recognize the user and retrieve a record relating to a request associated with the user. For example, the ATM can read the identification card and determine the name of the user. The ATM can transmit the user's name to the server and retrieve the record (i.e., cause the server to send the record to the user's device). Once the ATM retrieves the record, the ATM can display a message to the user based on the record. For example, the ATM can ask the user to upload a document using a wireless communication between the user's device and the ATM. In response to retrieving the record, the ATM can also activate a communication interface of the ATM. For example, if the record specifies that the user can transmit the media file using a wireless communication, the ATM can activate a wireless communication interface, e.g., NFC. If the record specifies that the user can transmit the media file using a wired communication, the ATM can activate a wired communication interface.

In one example embodiment, the message shown on the display of the ATM can ask the user to establish a wireless communication between the ATM and the user's device. A user can establish the wireless communication by, e.g., by pairing or syncing the user's device with the ATM. In one embodiment, the user can pair the device with the ATM. Pairing the device with the ATM can establish an initial bonding between the device and the ATM so that communication is allowed and facilitated between the two devices. In an example embodiment, the ATM can use Bluetooth, NFC or Wi-Fi communication standard for exchanging data and communication between the ATM and the device. Use of other wireless technology standards such as cellular wireless, CAT-M cellular, Induction Wireless, Infrared Wireless, Ultra Wideband, ZigBee, or a combination thereof is also conceivable.

In one embodiment, the ATM and the device can be paired or connected over a local wireless network. The local wireless network can be a Wi-Fi network, a Bluetooth network, an NFC network, etc. In another example embodiment, the ATM and the device can be paired or connected through a network such as the Internet. For example, each of the ATM and the device can connect to the Internet through a wireless connection or via a router or hub, and thus, the ATM can exchange data and communicate with the device using the Internet. In yet another example embodiment, the ATM and the device can be paired or connected through a combination of networks, e.g., a local network and the internet.

In an example embodiment, during the pairing, a link key is used, which can be a shared secret known between the ATM and the device. If both devices store the same link key, they are said to be paired or bonded. In some embodiments, it is possible to limit the communication of the device only to an ATM that was previously paired with the device. Such limitation can be implemented by cryptographical authentication of the identity of the ATM by the device to ensure that the ATM is the ATM that was previously paired with the device. Protection against eavesdropping is also possible by encrypting the exchanged data between the ATM and the device. Users can delete link keys from either device, which removes the bond between the devices. It is possible for one device to have a stored link key for a device with which it is no longer paired.

There can be various implementations for pairing an ATM with a device. In one embodiment, the user interface of the application can include a page for pairing the device with ATMs. In some embodiments, each of the device and/or ATM can include a discoverability mode, which can be activated by pressing a button (or user interface button) on the device or ATM. Once in discoverability mode, the ATM or device can find the device or the ATM and pair the two. In another embodiment, the ATM can automatically find the device once it is in the discoverability mode. Other implementations are also possible.

In one example, the user's device can include an application which can facilitate pairing the device with the ATM. The application can include a page for receiving instructions for pairing the device with the ATM. The page can display a plurality of devices available for pairing within a vicinity of the device. The user can select one of these devices, i.e., the ATM designated in the request. Upon, selection of the ATM, the device and the ATM can exchange information and establish a bond or pairing between the two devices. Once the user's device is paired with the ATM, the user can transmit information or data to the ATM. For example, the device can transmit a media file to the ATM using the application.

In one example embodiment, in order to prevent a man-in-the-middle attack, upon pairing, both the ATM and the device display the name or identification number of the device or ATM with which they are paired. For example, after a user's device is paired with an ATM, the user's device can display the name of the ATM and the ATM can display the name of the user's device.

In one example embodiment, the application can include a page for selecting and uploading a media file. For example, a user can store various media files on a memory of the device. The page can include a button for searching or displaying a directory or content stored on the memory of the user's device. When the user presses the button, the user can explore the directory or memory of the device and select a media file to be uploaded or transmitted to the ATM. The device can also include a button for initiating the uploading or transmission.

In one example embodiment, the device can include an application for generating a document. For example, the application can include a word processing application which can generate word or text documents. The user can run the application on the device and generate a word document. The application can include a button for uploading or transmitting the document to the ATM. In one embodiment, after generating the document, the user can visit a different application, e.g., a bank application, and select the generated document to be transmitted to the ATM.

In one example embodiment, the application can include a page for receiving a document from the ATM. The user can visit the page for receiving documents and select a directory on the device's memory to store the document. The page can also include an initiation button. Once the user presses the initiation button, the device can request the document from the ATM. In response, in one embodiment, the ATM can transmit the file to the device and the device can store the document in the directory provided by the user. In one embodiment, the downloaded document can be password protected. In the event the file is password protected, the ATM can display the password for the document after the user downloads the document. In another embodiment, the ATM can print the password on a sheet of paper and provide the paper to the user.

In one example embodiment, a wired connection between the device and the ATM can be used to transfer the media file to the ATM. For example, the ATM can include a USB plug and a user can plug a USB cable into the ATM, thereby connecting the device to the ATM. After the devices are connected, e.g., the device and the ATM established communication, the user can initiate file transfer on an application of the device.

Secure Transmission of the Media File to the ATM and/or Server

In one example embodiment, a security measure can be implemented to protect a communication between the user's device and the ATM (and/or the ATM and the server). The security measure can include encrypting the communication between the device and the ATM and/or encrypting the media file transferred between the ATM and the device.

In some embodiments, a communication between the device and the ATM can be encrypted, e.g., the communication can be encoded in such a way that only authorized parties or devices (e.g., the device, ATM or server) can decode or decrypt the communication. For example, the communication can be encrypted using a symmetric-key or a public-key scheme. For each one of these encryption schemes, there can be at least one key and an encryption algorithm stored on the device. Similarly, an associated key and an associated encryption (decryption) algorithm can be stored on the ATM (and/or the server). The device can encrypt a communication using the key and the encryption algorithm. The device can transmit the communication to the ATM. The ATM can decrypt the communication using the associated key and associated encryption algorithm. The ATM can also transmit the communication to the server, which can decrypt the communication.

In an example embodiment, the encryption scheme is the symmetric-key scheme. In this example, the device can store a symmetric key and an encryption algorithm. Example encryption algorithms can include Twofish, Serpent, AES (Rijndael), Blowfish, CASTS, Kuznyechik, RC4, DES, 3DES, Skipjack, Safer+/++(Bluetooth), and IDEA. The ATM (and/or server) can also store a copy of the symmetric key and the encryption (or decryption) algorithm. The device can receive the symmetric key from the server, e.g., the symmetric key could be downloaded with a banking application or as part of the banking application. As another example, the device can store a plurality of one-time-use symmetric keys. The device can dispose of each symmetric key after the key is used once. In response to a command from the user, e.g., transmit the media file, the processor of the device can encrypt a communication using the symmetric key and the encryption algorithm to create a cryptogram. The device can transmit the cryptogram to the ATM using a transceiver of the device. The ATM can in turn transmit the cryptogram to the server. The ATM (and/or the server) can decrypt the cryptogram using the symmetric key and the encryption (or decryption) algorithm.

In an example embodiment, the encryption scheme is the public-key scheme. In this example, the device can store a public (or private) key and an encryption algorithm. Examples of public-key encryption algorithms include Diffie-Hellman key exchange protocol, DSS, ElGamal, Paillier cryptosystem, RSA, Cramer-Shoup cryptosystem and YAK authenticated key agreement protocol. The ATM (and/or server) can store a private (or public) key and the encryption (or decryption) algorithm. In response to a command from the user of the device, the processor of the device can encrypt a communication using the public (or private) key and the encryption algorithm to create a cryptogram. The device can transmit the cryptogram to the ATM using a transceiver of the device. The ATM can in turn transmit the cryptogram to the server. The ATM (and/or server) can decrypt the cryptogram using the private (or public) key and the encryption (or decryption) algorithm.

In one example embodiment, the device can encrypt a media file when transferring the media file to the ATM. The media file can be encrypted using a symmetric-key or a public-key scheme. For each one of these encryption schemes, there can be at least one key and an encryption algorithm stored on the device. Similarly, an associated key and an associated encryption (decryption) algorithm can be stored on the ATM (and/or server).

In one example embodiment, the ATM encrypts any communication or media file it receives from the device. The ATM shares a key with the server and when the server receives the communication or media file, the server can decrypt the communication or media file. In one example, the ATM stores any communication or media file it receives from the device only on a short term memory. A reason for encryption or short term storage of the communications or media files is to prevent an attack on the ATM. In case the ATM is attacked, the user's information would not be compromised.

In one example embodiment, an ATM can transmit a communication and/or media file received from a device to a server. The server can be associated with the service provider. The ATM can use APIs and/or standard web interfaces for transmission of the communication and/or media file to the server. The ATM can encrypt the communication and/or media file when transmitting the communication and/or media file to the server. The encryption techniques can be similar to or more sophisticated than the encryption techniques implemented in the user device or the server. In one example embodiment, the ATM can process, manipulate, update, edit or revise a communication and/or media file before transmission to the server. In response to a successful transmission of a communication and/or media file to the server, the server can send a message to the ATM (and/or device). The ATM (and/or device) can display the message to the user.

Analysis or Processing of the Media File

In one example embodiment, the ATM or the server can analyze or process a media file received from a device. The analysis or processing can include performing an OCR technique, evaluating the content of a media file, evaluating the quality of the media file, evaluating accuracy of the media file, evaluating authenticity of the media file, etc.

In one example embodiment, the ATM (or the server) can run an optical character recognition ("OCR") technique. Using the OCR technique, the media file can be converted into an electronic document with machine-encoded text. Subsequently, the ATM (or the server) can evaluate the text of the document. For example, the ATM (or the server) can use a natural language processing technique to determine whether the user transmitted the document that the user was asked to provide. The natural language processing technique can evaluate the first few lines of the document (or the whole document) and determine whether there is a connection or similarity between the text of the request (or the record associated with the request) and the text of the document. In one example embodiment, a machine learning model can be used to determine whether there is a connection between the request and the media file provided. If the document and the request are similar enough, the ATM (or the server) can determine that the document is responsive to the request. Otherwise, the ATM (or the server) can determine that the document is not response to the request.

As an example, a request can ask a user to provide a copy of the user's birth certificate. The user can take a photo of the birth certificate in an application of a bank. The user can send the photo to the ATM using the application. Once the ATM receives the photo, the ATM can perform an OCR technique on the photo. Then, using a natural language processing technique (or machine learning model), the ATM can evaluate the content of the document. If the document includes information such as name, date, place, and the word "birth," the ATM can conclude that the document is a birth certificate. Additionally, if the document contains the user's name, the ATM can conclude that the birth certificate belongs to the user. Therefore, the ATM can conclude that the user provided the right birth certificate. In one example embodiment, the ATM can evaluate the expiration date included on a document. If the uploaded document includes an expired date, the ATM can alert the user.

In one example embodiment, the ATM (or the server) can use a computer vision technique to analyze an uploaded media file. Computer vision techniques can verify images or pictures. For example, using a computer vision technique, a logo of a company can be evaluated. If the document uploaded by the user purports to be a New York state ID, but does not include the appropriate logo, the ATM can alert the user. A computer vision technique can also verify watermarks.

In one example embodiment, the ATM (or the server) can translate the text of the media file and analyze the translated text. For example, if a user is asked to provide the user's foreign tax returns, the ATM can translate the uploaded document. A natural language processing module (or a machine learning model) of the ATM can evaluate the content of the document. If the document includes words such as "tax," "income" and "interest," and a name, the module can determine that the document is a tax return. Additionally, if the document is translated from French, the module can conclude that the document is a foreign tax return. Lastly, if the document includes the user's name, the module can determine that the document is a foreign tax return of the user of the account.

In an example embodiment, the ATM (or the server) can evaluate the media file to determine the quality of the file. For example, the ATM (or the server) can include a module which can evaluate a photo and determine if there is too much light or glare in the photo. Additionally, the module can determine if the device was shaking when it took the photo. The module can also evaluate the resolution of the photo. If the resolution is below a threshold value, the module can determine that the photo has a low resolution. In evaluating the resolution of the photo, the module can also consider whether the ATM is able to successfully OCR the photo. If a relatively large percentage of the characters in the photo are not recognized, the module can determine that the photo has a low quality.

In one example embodiment, the ATM (or the server) can include a module which can determine if the whole document was scanned. For example, if part of the document is not included in the photo or if part of the document is covered in the photo, the module can determine that the photo is defective.

In one example embodiment, after the ATM (or the server) determines that there is a problem with an uploaded media file, e.g., low resolution, the document is expired, the name does not match, wrong document was uploaded, etc., the ATM (or the server) can send a notification to the user. For example, the ATM can send a message to the user through the wireless connection established between the ATM and the device. As another example, the server can send a notification to the application of the user's device. The message or the notification can indicate that a problem is identified with the media file uploaded by the user. For example, the message or the notification can indicate that the document has a low resolution; the document is expired; the name on the document does not match the name of the account holder; and wrong document was uploaded. In response the user can upload a new media file.

In this disclosure, several examples of analyzing or processing a media file were discussed. Although some of these functions were discussed with respect to the ATM, one of ordinary skill in the art recognizes that the server and/or the device can also perform the same functions and alert the user if the document is defective.

Example Embodiment

Figure 4:
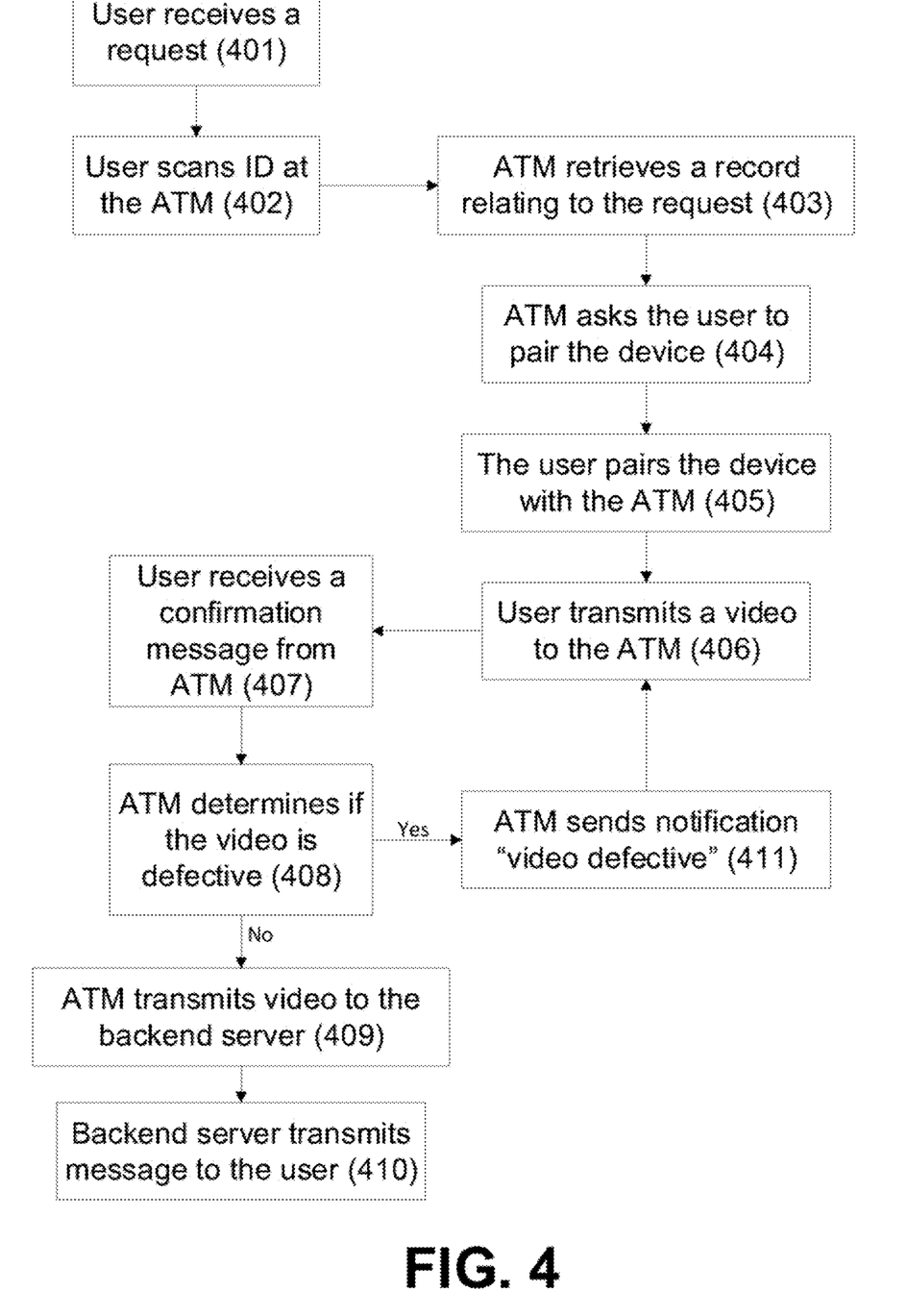
FIG. 4 shows an example flow chart for preparing and transmitting a document to an ATM.

FIG. 4 shows an example flow chart for preparing and transmitting a media file to an ATM. In this example embodiment, in step 401, the user can receive a request for providing a video of the user holding a ball. The request can be received as a notification on a bank application of the user. The bank can make the request to verify the identity of the user, e.g., after the user asked for an unusual transaction. The request can also ask the user to transmit the video to the ATM located on 123 Main Street. In step 402, the user can visit the ATM and provide an identification card (and PIN) to the ATM. In step 403, the ATM can retrieve a record relating to the request from a backend server. The record can explain that the user needs to upload a video showing the user holding a ball. In step 404, the ATM can display a message asking the user to pair the user's cellphone with the ATM using an NFC network. In step 405, the user can activate the NFC connectivity mode on the user's device and select the ATM to which the device needs to connect.

After the ATM and the device are paired, in step 406, the user can upload a video onto the ATM. In step 407, the ATM can send a notification to the device that the video is received at the ATM. In step 408, the ATM can analyze the video to determine if the video is defective. If the ATM does not find any issues with the video, in step 409, the ATM can transmit the video to the backend server, and in step 410, the backend server can transmit a notification to the device that the video is received.

In one example embodiment, the video uploaded by the user can be defective. For example, the user might have uploaded a video of the user's wife riding a bike. The ATM can receive a copy of the request from the server. The ATM can evaluate the request and determine that the request requires a video showing the user holding a ball. The ATM can review the video and, using an object recognition module, determine that a bike and a female person are present in the video. A facial recognition module of the ATM can further compare the face of the user (e.g., photo of the user on file or photo of the user taken in front of the ATM) with the face of the bike rider and determine that the bike rider is not the user. As a result, in step 411, the ATM can send a notification to the user's device and indicate that the video is defective. The notification can ask the user to upload another video. The flow chart can continue to step 406, in which the user can upload a video.

Although in this example embodiment the ATM includes the object recognition module, in another example embodiment, the object recognition module can be provided on a data store on the server. The ATM can submit the video to the server and the server can analyze the video, e.g., determining whether the user's action in the video is responsive to the request.

In one example embodiment, the server and the ATM are configured to provide a file to a user. For example, a user may submit a request to receive a copy of a file through a secure transmission (or the server can send a notification to a user to pick up a file). The server can transmit the file to a designated ATM and the user can visit the designated ATM to download the file. Specifically, the user device can notify the ATM that the device is within a vicinity of the ATM. Upon pairing of the two devices, the ATM can transmit the file to the user device. Each of the user's device, the ATM and the server can encrypt or decrypt the file before transmission or after receiving the file. For example, the server can encrypt the file before transmission to the ATM. The user's device can decrypt the file after receiving the file from the ATM. The user's device, ATM and server can be capable of all the functions described for the embodiments relating to transmission of a file to the server from a user's device. The user's device can include an application which can facilitate interaction with the ATM. The application can receive the file from the ATM, and decrypt the file to display it to the user.

Non-ATM Applications

Embodiments of this disclosure describe various features and functionalities for ATMs. However, ATMs are only one device in the family of self-service devices and these descriptions are not limited to ATMs. In fact, these features can be implemented in other devices which have similar components to ATMs, e.g., kiosks, ticket machines, information stations, charging stations, etc. For example, a self-service kiosk which does not dispense cash can be used to implement the features of these disclosures.

An example kiosk or similar device can include a network interface for receiving a document from a user device and transmitting the document to a backend server. The network interface may provide wired or wireless connectivity. The example kiosk or device can optionally include a display screen and be located in a location that can be characterized as safe or controlled.

The user's device can be any device including cellphone, smart phone, smart device, tablet, wearable device, laptop, etc. Although certain functionalities of these disclosures are described with respect to an application of a financial institution, one of ordinary skill in the art recognizes that the application does not have to be associated with a financial institution. In fact, another application on a user device can be programmed to perform these functions.

Technical Implementation of a Processing Unit or a Server

Figure 5:
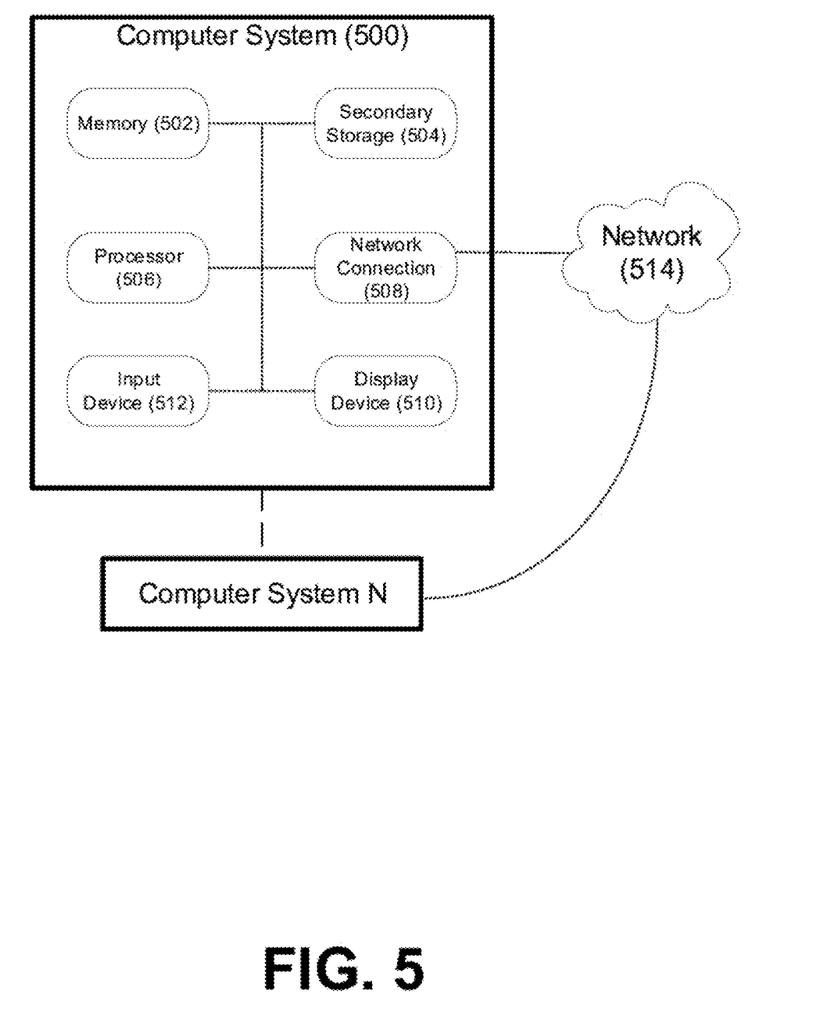
FIG. 5 illustrates exemplary hardware components for a processing unit.

FIG. 5 illustrates exemplary hardware components of a server or processing unit. A computer system 500, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 500, may run an application (or software) and perform the steps and functionalities described above. Computer system 500 may connect to a network 514, e.g., Internet, or other network, to receive inquires, obtain data, and transmit information and incentives as described above.

The computer system 500 typically includes a memory 502, a secondary storage device 504, and a processor 506. The computer system 500 may also include a plurality of processors 506 and be configured as a plurality of, e.g., bladed servers, or other known server configurations. The computer system 500 may also include a network connection device 508, a display device 510, and an input device 512.

The memory 502 may include RAM or similar types of memory, and it may store one or more applications for execution by processor 506. Secondary storage device 504 may include a hard disk drive, floppy disk drive, CD-ROM drive, or other types of non-volatile data storage. Processor 506 executes the application(s), such as those described herein, which are stored in memory 502 or secondary storage 504, or received from the Internet or other network 514. The processing by processor 506 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 500 may store one or more database structures in the secondary storage 504, for example, for storing and maintaining the information necessary to perform the above-described functions. Alternatively, such information may be in storage devices separate from these components.

Also, as noted, processor 506 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 500.

The input device 512 may include any device for entering information into the computer system 500, such as a touch-screen, keyboard, mouse, cursor-control device, microphone, digital camera, video recorder or camcorder. The input and output device 512 may be used to enter information into GUIs during performance of the methods described above. The display device 510 may include any type of device for presenting visual information such as, for example, a computer monitor or flat-screen display (or mobile device screen). The display device 510 may display the GUIs and/or output from sub-system components (or software).

Examples of the computer system 500 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 500 is shown in detail, system 500 may use multiple computer systems or servers as necessary or desired to support the users and may also use back-up or redundant servers to prevent network downtime in the event of a failure of a particular server. In addition, although computer system 500 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 500, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:
    authenticating at an ATM a user, wherein the ATM includes a contactless card reader, a cash dispenser and a vault for storage of money;
    activating a wireless receiver of the ATM for receiving an encrypted media file in response to authenticating the user;
    receiving, via the wireless receiver of the ATM, the encrypted media file from a client device associated with the user;
    decrypting, by a processor of the ATM, the encrypted media file using a master key to generate a media file;
    converting, by the processor using an OCR algorithm, the media file into an electronic document with machine-encoded text;
    applying, by the processor of the ATM, a natural language processing technique to the media file to determine a degree of similarity between the media file and a request;
    displaying a warning on a display of the ATM if the processor determines that the degree of similarity between the media file and the request falls below a threshold value; and
    transmitting the media file from the ATM to a server if the processor determines that the degree of similarity between the media file and the request exceeds the threshold value.

2. The method of claim 1, wherein the warning is displayed when the media file has a low quality, is an incomplete document, or has an invalid date.

3. The method of claim 1, wherein the wireless receiver is configured to receive a wireless communication using Bluetooth, Wi-Fi, or NFC.

4. The method of claim 1, wherein the media file is a photo.

5. The method of claim 1, wherein prior to receiving the encrypted media file at the ATM, the client device is synced or paired with the ATM.

6. The method of claim 5, further comprising:
    displaying a verification message on a display of the ATM, wherein the verification message indicates to a user of the client device if the client device is synced or paired with a correct ATM.

7. The method of claim 6, wherein the verification message displays an identity of the client device connected to the ATM.

8. The method of claim 1, further comprising:
    storing the encrypted media file in a short-term access memory of the ATM prior to transmitting the media file to the server.

9. The method of claim 8, further comprising:
    deleting the media file from the short-term access memory after transmitting the media file to the server.

10. The method of claim 1, further comprising applying an object recognition technique to the media file to determine a degree of similarity value between the media file and a request.

11. The method of claim 1, further comprising applying a computer vision technique to the media file to detect a watermark to determine a degree of similarity value between the media file and a request.

12. A method comprising:
receiving at a server from a client device a location of the client device;
transmitting, from the server to a plurality of ATMs, poling requests;
receiving, from a subset of the plurality of ATMs, responses, each response indicating whether an ATM associated with a polling request has capability to receive an encrypted media file;
designating, at the server, an ATM based on the response and the location;
transmitting, from the server to the client device, an identification of the ATM;
receiving at the server the encrypted media file from the ATM;
decrypting, by a processor of the server, the encrypted media file using a master key to generate a media file;
applying, using the processor, a natural language processing technique to the media file to determine a degree of similarity value between the media file and a request;
transmitting a warning message to the ATM if the processor determines that the degree of similarity value falls below a threshold value; and
transmitting a success message to the ATM if the processor determines that the degree of similarity value exceeds the threshold value.

13. The method of claim 12, wherein the media file is a photo.

14. The method of claim 12, wherein, using an OCR algorithm, the processor of the server converts the media file into an electronic document with machine-encoded text.

15. The method of claim 12, further comprising applying an OCR algorithm to the media file to determine a degree of similarity value between the media file and a request.

16. The method of claim 12, further comprising applying a template algorithm to the media file to determine a degree of similarity value between the media file and a request.

17. The method of claim 12, further comprising applying a facial recognition technique to the media file to determine a degree of similarity value between the media file and a request.

18. The method of claim 12, further comprising applying an object recognition technique to the media file to determine a degree of similarity value between the media file and a request.

19. The method of claim 12, further comprising applying a computer vision technique to the media file to detect a watermark to determine a degree of similarity value between the media file and a request.

* * * * *